Dec. 29, 1925.
A. KÖNIG
1,567,654
PORCELAIN CRUCIBLE
Filed August 5, 1924
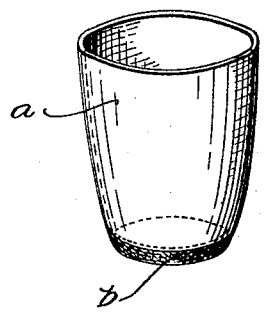
Inventor:
Alfred König
By: *[signature]*
Attorney.

Patented Dec. 29, 1925.

1,567,654

UNITED STATES PATENT OFFICE.

ALFRED KÖNIG, OF CHARLOTTENBURG, GERMANY, ASSIGNOR TO THE FIRM: STAATLICHE PORZELLAN-MANUFACTUR, OF BERLIN, GERMANY.

PORCELAIN CRUCIBLE.

Application filed August 5, 1924. Serial No. 730,246.

*To all whom it may concern:*

Be it known that I, ALFRED KÖNIG, a citizen of the German Republic and a resident of Charlottenburg, Germany, have invented certain new and useful Improvements in Porcelain Crucibles, of which the following is a specification.

My invention relates to porcelain crucibles intended for use especially in connection with analytical works and being distinguished by its particular bottom which consists of another fine-porous material. This improved porcelain filtering-vessel is intended as a substitute for the known Gooch-filtering-vessel which consists entirely of porcelain and has a perforated bottom on which asbestos is laid prior to the employment of this vessel for the filtering purpose.

Now, in my improved porcelain crucible the bottom, in contradistinction to that of Gooch, does not consist also of porcelain, but of another, fine-porous mass through which the sediment or precipitate can be sucked off without any preparation, especially without placing any separate filtering-substance into it, or laying such a substance on the bottom of the vessel respectively.

My invention is illustrated by way of example in the accompanying drawing which shows a perspective view of a porcelain crucible made according to my invention.

On the drawing *a* denotes the body of the crucible, and *b* the bottom which consists of a finely porous material melted together with the porcelain.

I claim:

As a new article of manufacture porcelain crucible having a bottom of finely porous material melted together with the porcelain.

In testimony whereof I affix my signature.

ALFRED KÖNIG.